May 26, 1953     H. L. LAWSON     2,639,657
AUTOMATIC COOKER
Filed May 4, 1950     6 Sheets—Sheet 1
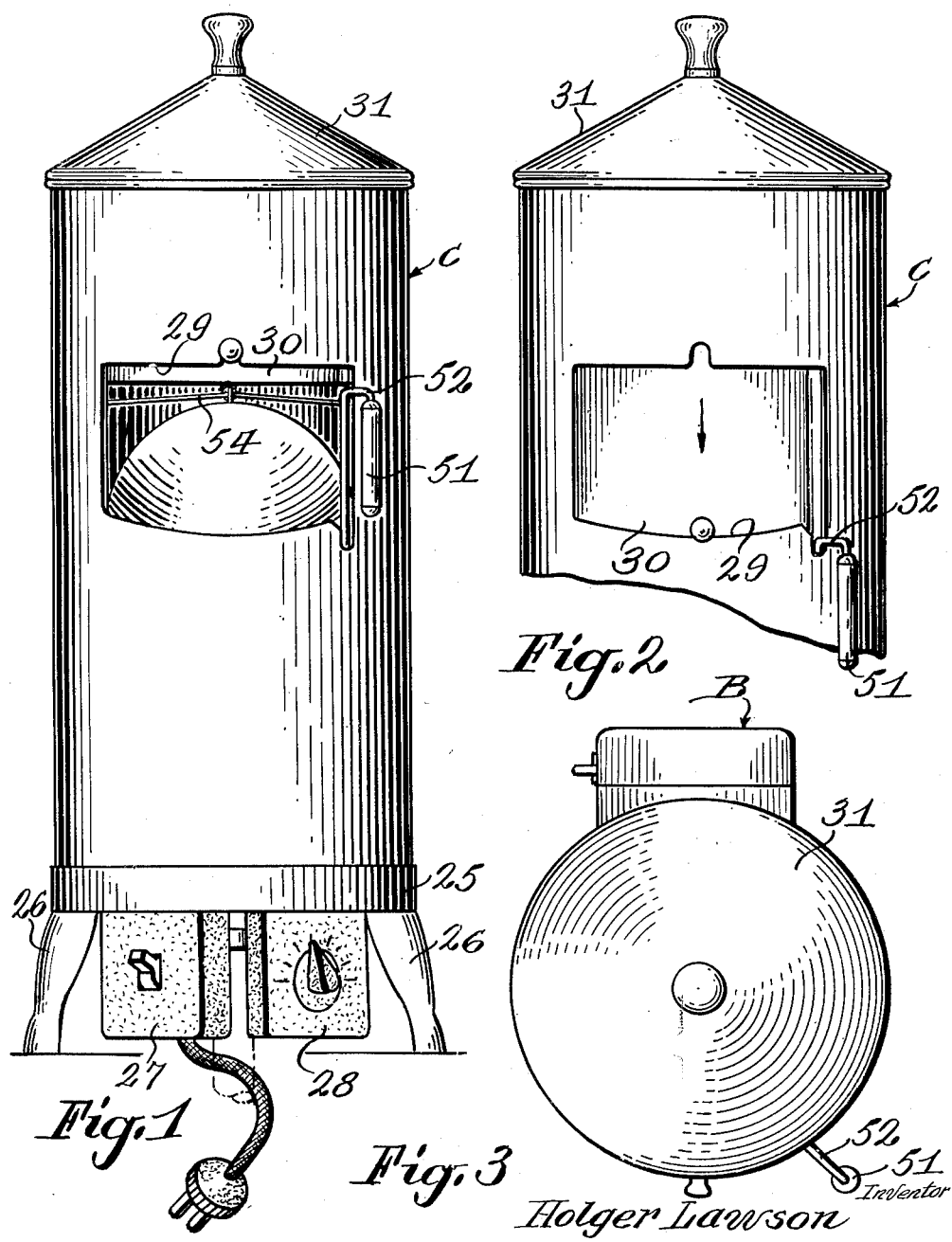
Holger Lawson
Inventor
Attorneys May 26, 1953　　　H. L. LAWSON　　　2,639,657
AUTOMATIC COOKER
Filed May 4, 1950　　　　　　　　　　　　6 Sheets-Sheet 2
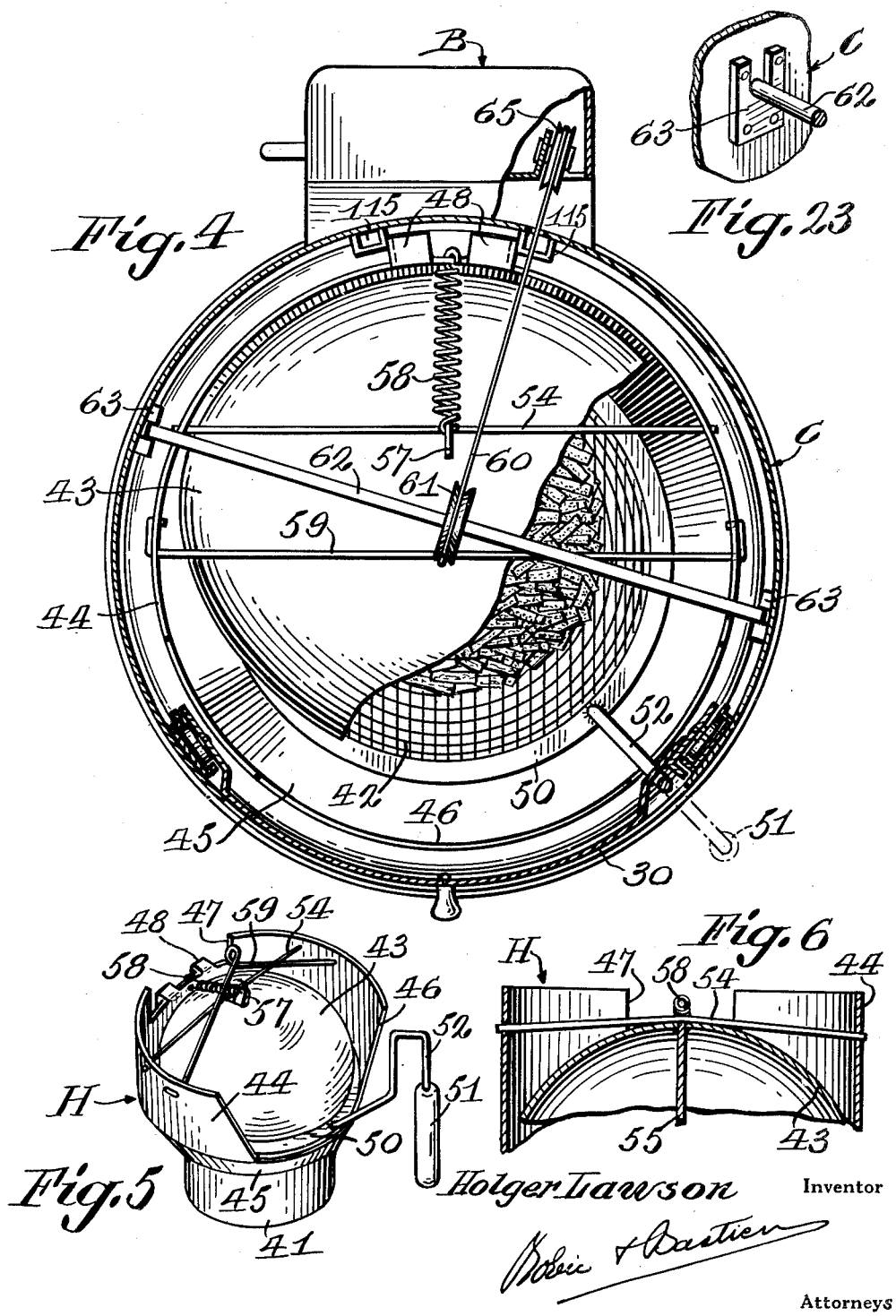

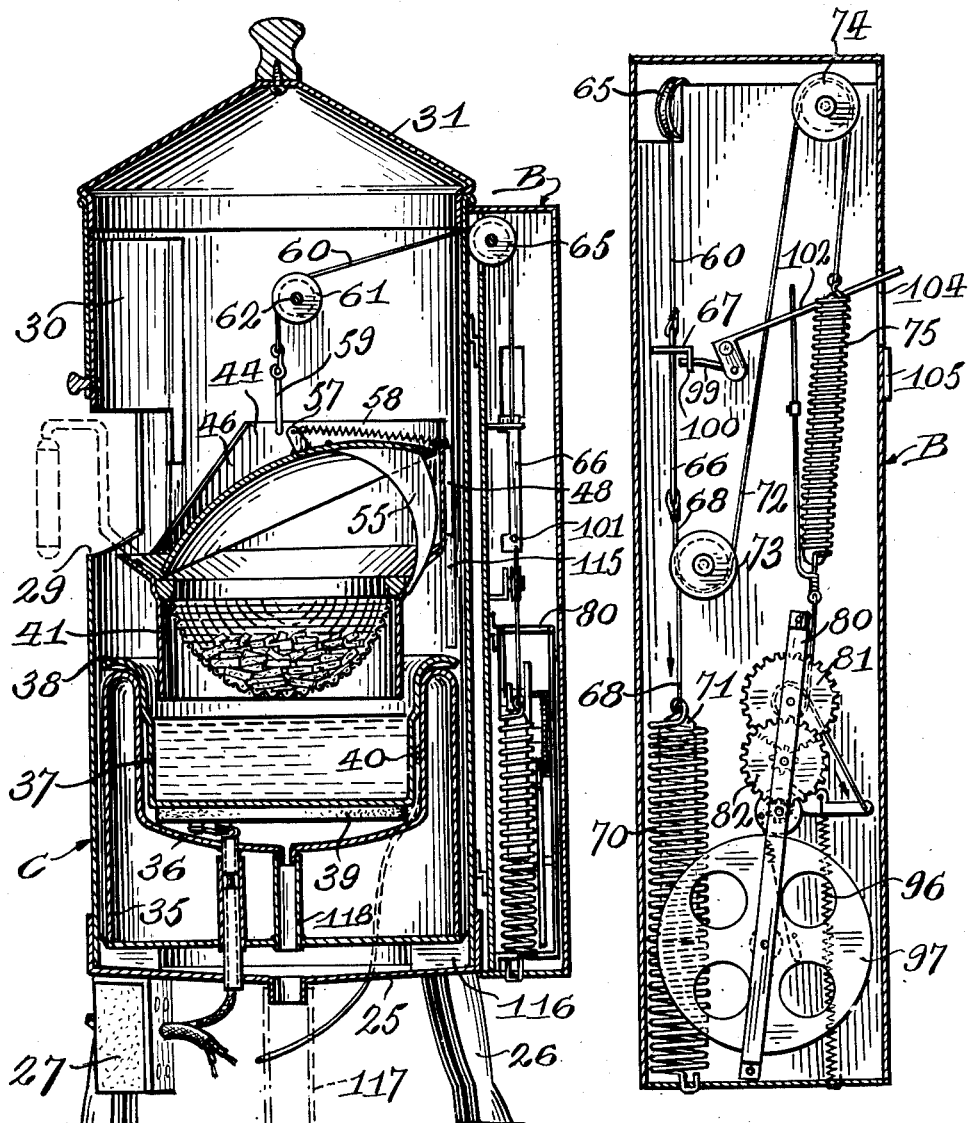

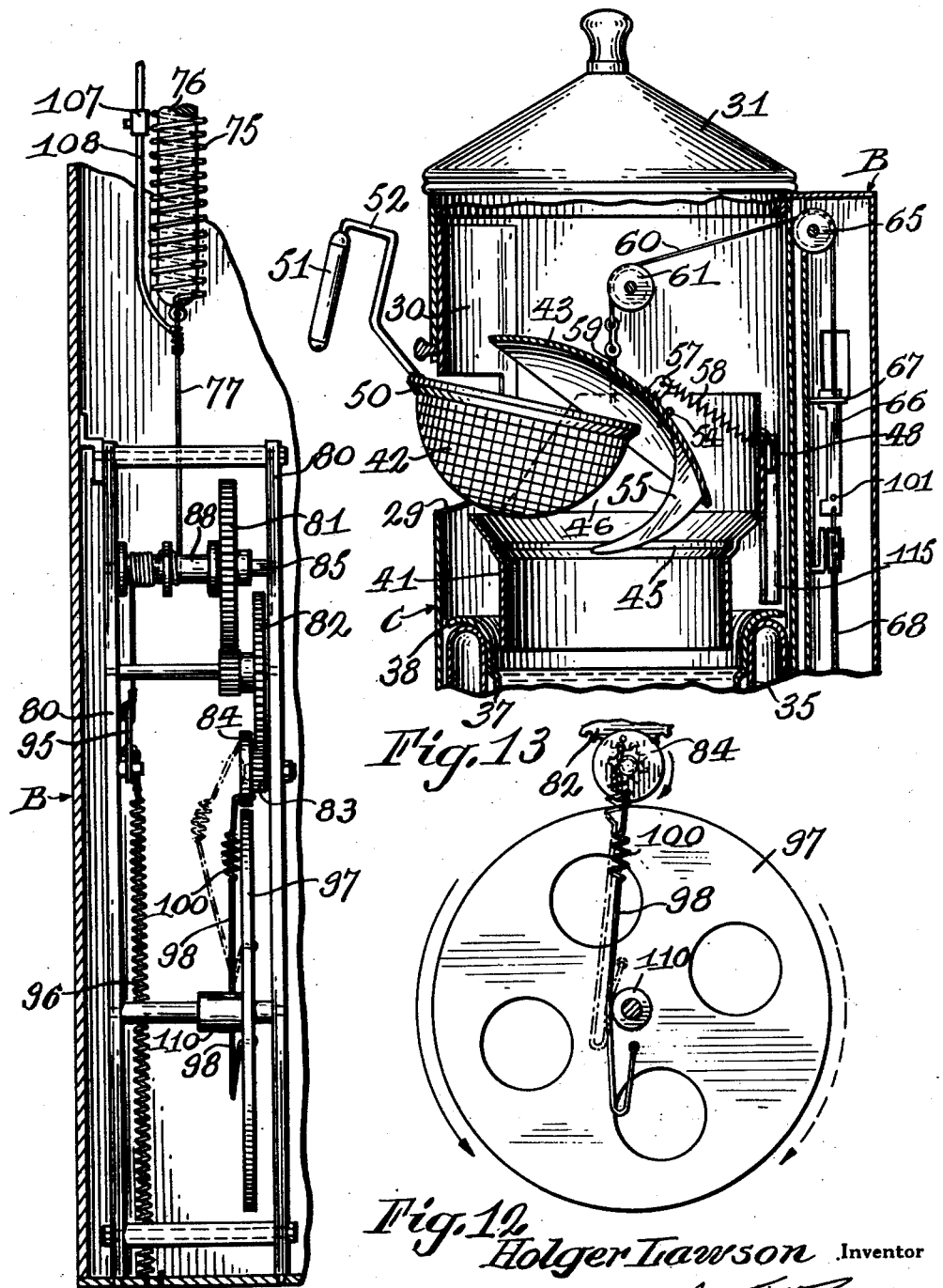

May 26, 1953　　　H. L. LAWSON　　　2,639,657
AUTOMATIC COOKER

Filed May 4, 1950　　　　　　　　　　　　6 Sheets-Sheet 6

Holger Lawson Inventor

Attorneys

Patented May 26, 1953

2,639,657

UNITED STATES PATENT OFFICE 2,639,657

AUTOMATIC COOKER

Holger L. Lawson, Montreal, Quebec, Canada

Application May 4, 1950, Serial No. 159,950

1 Claim. (Cl. 99—336)

The present invention relates to cookers and, more particularly, automatic time and temperature controlled food cookers.

The main object of the invention resides in the provision of means of the character described highly efficient for the purpose in view.

Another object is the provision of a food cooker adapted to prepare small portions in rapid succession for retaining the tastiness of freshly-cooked food.

A further object contemplates an automatic food cooker which is free of cooking odours and fumes.

Still another object provides for a device of the character described having means for automatically regulating the time of cooking as well as the temperature thereof.

A still further object envisages an automatic cooker of rugged construction, foolproof operation and obtainable at a reasonable cost.

Other objects and advantages of the invention will become apparent, or be pointed out further, during the description to follow.

As an example, and for purposes of illustration only, an embodiment of the invention is shown in the annexed drawings, wherein:

Figure 1 is a front elevational view of the cooker with the loading door open,

Figure 2 is a similar partial view showing the door closed,

Figure 3 is a plan view of the said cooker,

Figure 4 is an enlarged plan view of the apparatus with the cover removed, showing a part of the frying basket, Figure 5 is a perspective view of the complete movable basket holder;

Figure 6 is a partial vertical section through the top of said basket holder;

Figure 7 is a vertical section through the apparatus of the invention showing the basket in raised inoperative position;

Figure 8 is an elevation of the timing mechanism in the inactive position corresponding to the raised basket of Figure 7;

Figure 11 is a partial enlarged and lower side view of the timer;

Figure 12 is a front elevation of the timer balance wheel;

Figure 13 is a vertical section through the upper part of the apparatus as the basket is removed or inserted;

Figure 22 is a perspective of the timer locking latch, and

Figure 23 is a perspective of a support bracket for the rod of the holder pulley.

Figures 9, 10:
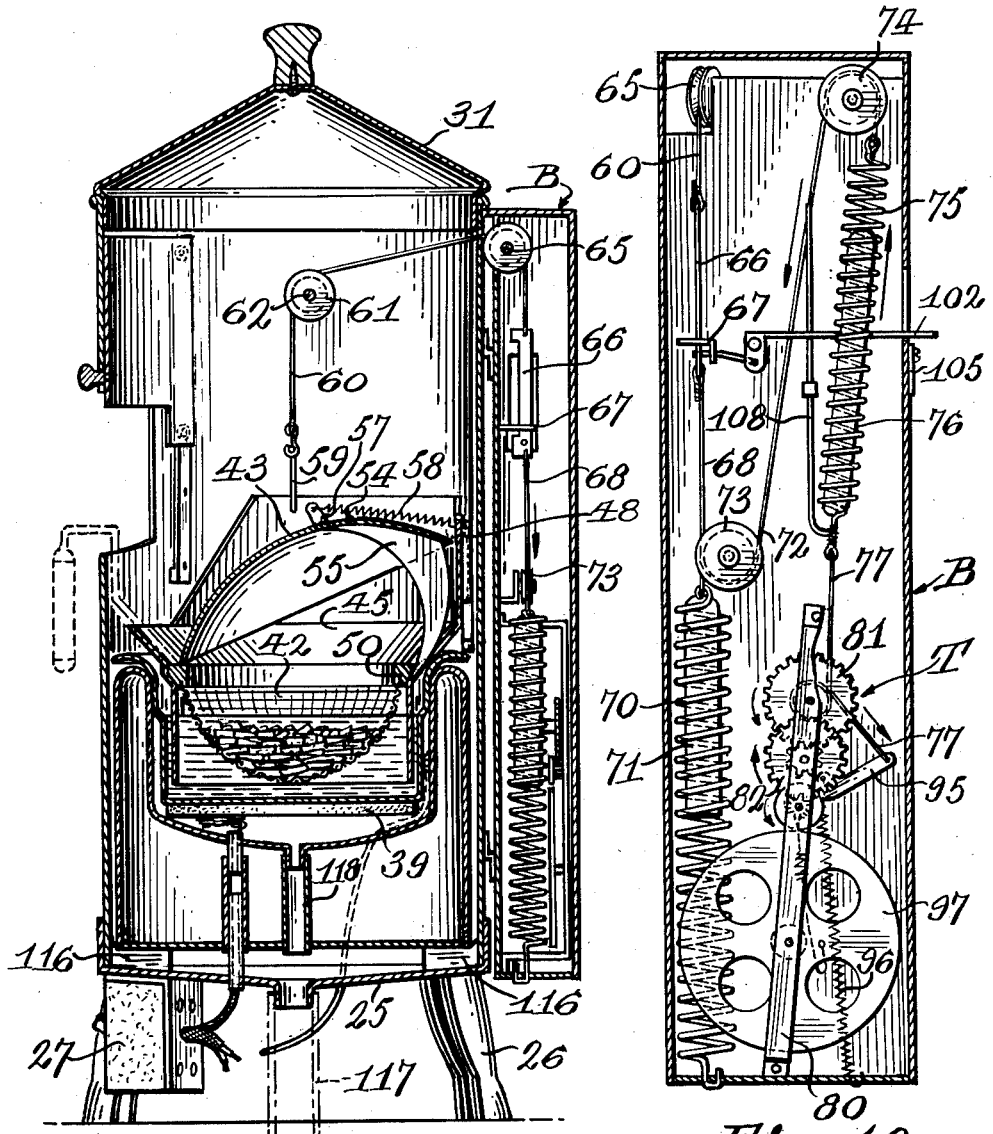
Figure 9 is a view similar to Figure 7 but showing the basket immersed in the frying medium.
Figure 10 is also an elevation of the timer in operation and corresponding to the basket position of Figure 9.
Figure 14:
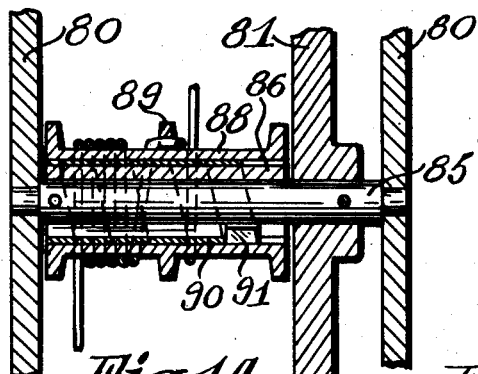
Figure 14 is a longitudinal section through the clutch of the timer.
Figure 15:
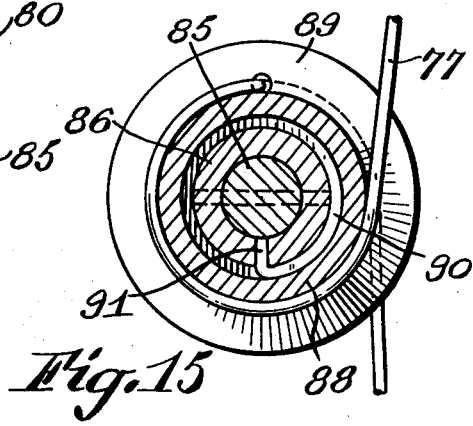
Figure 15 is a transverse section thereof.
Figure 16:
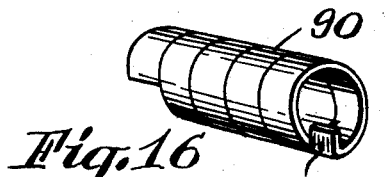
Figure 16 is a perspective of the clutch spring.
Figure 17:
Figure 17 is a plan view of the timer tripper arm.
Figure 19:
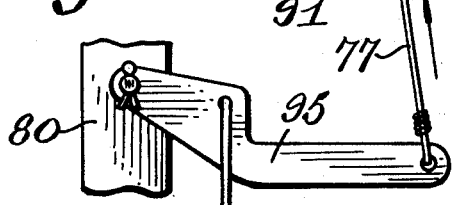
Figure 19 is an elevation of a spring-loaded tension lever.
Figure 18:
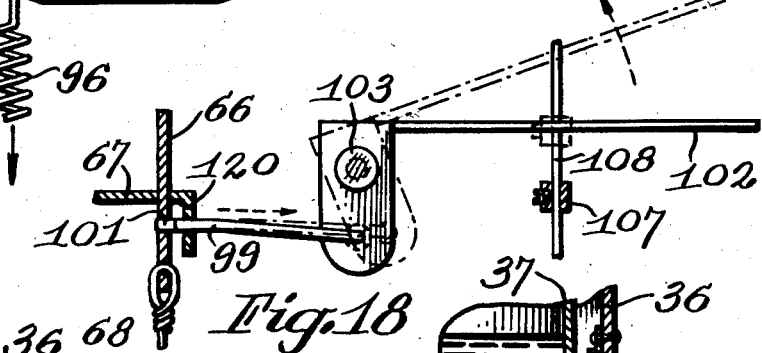
Figure 18 is an elevation of said tripper.
Figure 21:
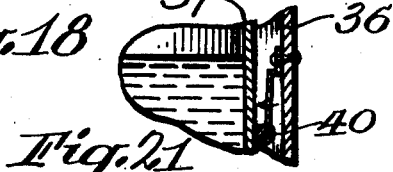
Figure 21 is a transverse section through said bulb.
Figure 20:
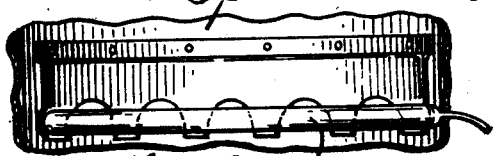
Figure 20 is an elevation of a thermostat bulb.

Referring to the drawings, wherein similar reference characters represent corresponding parts throughout, the reference letter C designates the casing of the cooker, which casing rests in a base 25 supported onto legs 26 and carrying an on-and-off switch 27 as well as an adjustable thermostatic switch 28. The casing is a cylinder open at the top and having an aperture 29 closed by a sliding door 30; likewise, a removable cover 31 serves to close the open top of the casing.

As shown to advantage in Figures 3—4—7—9, the casing C is provided at the back thereof with a vertical narrow box B enclosing the timing mechanism to be described later.

Inside the casing, at the bottom thereof, there is disposed a hollow member 35 suitably spaced from the side and bottom walls of said casing, which member is depressed at the upper inside portion to form a well 36. In this well a container 37 is suspended by means of a marginal flange 38 engaging the top edge of 35; the container is adapted to hold a quantity of frying medium, such as grease or a vegetable oil, heated by means of an electric heating element 39 disposed immediately thereunder controlled by the thermostatic bulb 40 and the switch 28.

In and out of the container 37 a holder H is movable, said holder having for its function to support the food basket 42 and a domed cover 43. In Figure 5, the holder generally shown at H consists in a funnel-like structure having a lower sleeve 41 and an upper larger sleeve 44, both of which are connected by a short tapered neck 45. The upper sleeve 44 is cut at 46, to form a large notch permitting passage of the basket 42; and at the back also notched at 47 to provide tongues 48, struck from the sleeve wall, and folded back thereagainst as shown in Figures 4 and 5.

The holder acts as a support for a basket 42 of foraminous material adapted to fit closely in the neck 45 by means of a rim 50 to which said basket is attached. For convenience of manipulation, a hand grasp 51 is secured to the rim at the end of an angularly offset handle 52. Thus, the basket can be inserted inside its holder by means of the long handle which is calculated to extend outside, and to one side, of the door aperture when in place. (See Figs. 1–2).

To close the top of the holder, so as to prevent sputtering of the frying medium outside thereof, to conserve heat and condense vapors back into the container 37, the pivoted cover 43 is pivotally mounted in the mouth of the holder onto an arched pivot rod 54 to which it is welded, said rod being pivoted in suitable apertures formed at the edge of sleeve 46 (Fig. 5). Thus, the cover moves along an arc as it oscillates back and forth around its pivot.

Inside the cover there is secured a spur 55, one end of which 56 extends through said cover as a lug 57 to which one end of a spring 58 is attached; the other end of said spring being fixed to the lower edge of the notch 47, in such a manner that this end of the spring is anchored in a plane lower than that of the rod. The result is a toggle action tending to hold the cover in closed, or open, position as the case may be. The spur is so shaped that it swings out of the way the basket, when the cover is closed (Fig. 9), or stands in the way of said basket in open position of the cover (Fig. 13); consequently, the insertion of the basket inside the holder acts to push the spur and automatically snap the cover shut. The basket holder is completed by the addition of a bail 59, to which the flexible cable or wire 60 is attached, for raising the basket out of the frying medium.

The cable 60 is passed over a loose pulley 61 supported by a removable shaft 62 held at the top of the casing in the forked brackets 63; the purpose of this arrangement is to remove easily the shaft and pulley to clear the way when it is desired to lift the holder out of the casing through the top. (Figs. 4–23).

From casing C cable 60 extends over a second pulley 65 into the timing box, and downwardly therein to the upper end of a latch plate 66 slidable in a fixed bracket 67; the lower end of the plate is secured to a short cable 68 attached to the upper end of a helical spring 70 anchored at its lower end to the bottom of the box B. Said spring is so designed and tensioned that the pull thereof on the cable 66 is greater than the combined weight of the holder H, the basket 42 and the food therein: thus, the spring tends to keep the holder raised at all times. In order to stabilize and equalize this action, however, a weight 71 is slipped inside the spring and attached to the lower end of cable 68.

A second cable 72 is also attached to the lower end of latch plate 66, said cable being trained over a lower pulley 73, and upper pulley 74 and attached to the upper end of a second helical spring 75, said spring having an inside guiding and limiting rod 76. To the lower end of the spring 75 there is secured a very flexible waterproof cord or cable 77, which cord extends downwardly to the timer mechanism T to be presently described.

Said timer includes a sub-frame 80 secured to the box B and in which is rotatively mounted a gear train including the spur gears 81 and 82, the pinion 83 and attached wheel 84. The gear 81 is pinned to a shaft 85 (Fig. 14) freely journalled in the sub-frame and to which a sleeve 86 is also pinned: thus, both gear 81 and sleeve are secured to the shaft. Freely mounted over said sleeve, between gear 81 and frame 80, there is provided a spool 88 divided in two adjacent sections by a central flange 89; said spool is bored axially to fit very loosely over the sleeve 86. The space between said sleeve and spool is taken up by a helical spring 90 of flat ribbon, one end of which 91 is held in a longitudinal slot formed in the sleeve: said spring is of resilient shim stock of a thickness such as to allow free rotation of the spool with little friction. This rotation is possible, however, in one direction only, namely: in the direction tending to wind the free end of the spring around the sleeve. Thus, reverse rotation is checked by the unwinding of the spring which expanding same, wedges it between sleeve and spool, in accordance with the known principle of free-wheelings and the like.

The cord 77 is wound over one section of the spool, secured to the rib 89, passed through an aperture in same and therefrom to the end of a lever 95 pivoted to the sub-frame and urged downwardly by a spring 96. The timer proper is completed by the addition of an oscillating disc 97 acting in much the same fashion as the escapement wheel of clockwork. Said disc is freely mounted in the subframe below and in the plane of the wheel 84; it is connected to said wheel by means of a wire link 98 folded at one end upon itself, hair-pin fashion, and provided with intermediate coils 100 for purposes of resiliency (see Figures 11 and 12).

The holder is held in immersed position (Figures 9 and 10), and the springs 70–75 extended, by means of a latch 99 passing through the ear 120 of the bracket 67 and adapted to enter a hole 101 of the latch plate 66. Thus, the said plate is immobilized until the latch 99 is withdrawn, this action being effectuated by the timer through the intermediary of a tripper arm 102 to which the latch is connected. Said arm is pivoted at 103 to the box B and extends outside thereof, through an aperture 104, for engagement by a dog 105 when it is desired to dispense with the timer action (Figure 22).

The tripper arm is normally actuated by gravity alone and tends to press the latch 99 at all times against the plate 66; it is raised from an horizontal position by a stop 107 adjustably secured to an upstanding rod 108, extending through a slot 106 of the arm, and secured to the lower end of spring 75.

The operation of the timer is as follows: When the holder H is lowered into the frying medium, the cables 68 and 72 are pulled to extend the springs 70 and 75. The tension imparted by the spring 75 to the cord 77 tends to unwind the same, rotating the spool 88; since, however, the coiled spring 90 prevents free rotation of the spool 88 in this direction, the unwinding effect is transmitted to the shaft and, hence, to the gear 81.

The said gear, in turn, urges the rotation of the wheel 84, through the gear train. This rotation is converted into oscillation of the disk 97 through the action of the resilient link 98. The link 98 is prevented from over-running at one end of its oscillating stroke by contact between the hair-pin section and the boss 110, and at the other end of its stroke by contact between its middle length and the boss 110. This arrangement tends to prevent speeding up of the oscillation when the tension of the spring 75 is increased, permitting the disk 97 to over-run against the resilience of the link. The result of this arrangement is a continuous slow rotation of the wheel 84 in one direction while the disk oscillates back and forth. The rotation of the wheel 84 permits the slow unwinding of the cord from the spool and a corresponding slow shortening of the spring 75 until the stop 107 lifts the arm 102 to retract the latch 99 from engagement with the plate 66. The disengaged plate now liberates the cables 68 and 72 permitting retraction of the spring 70 and raising of the holder H. As the spring 70 retracts, the spring 75 also retracts until this retraction is arrested by the limiting rod 76. As the spring 70 continues to retract, the spring 75, together with the limiting rod 76, descend under their own weight and the spring 96 acting on lever 95 and cord 77, rotates the spool 88 in the free-wheeling direction thereby rewinding the cord 77 so as to shorten the portion of said cord between spring 75 and spool 88, until the timer is reset for further operation.

As explained previously, the retraction of spring 70 will cause raising of the holder and basket from the frying medium, whereby cooking of the food in said basket is at once interrupted, and the attendant is warned by the position of the grasp 51 which is raised at the side of the door 30 by the basket itself (see Fig. 1).

Other features of the cooker include stops 115, secured on the inside of the casing, to prevent rotation of the holder by engagement with the lugs 48, and a vapor-condensing arrangement preventing escape of fumes and cooking odours in the surrounding atmosphere. For that purpose, the hollow member 35 is held spaced from the casing and supported in the base 25 onto blocks 116 to provide a space also underneath said member. A drain 117 is provided in the center of the base for conducting away water resulting from the condensation of steam and vapours on the cold walls of the casing. Similarly, the concave bottom of the well 36 is drained through the pipe 118 into the base 25; consequently, the entire mechanism can be removed through the top of the casing for servicing, or cleaning.

Again for eliminating odors and fumes, the door 30 is fitted so as to slide up and down in slides slightly converging downwardly: therefore, said door is wedged more or less, when closed, to make a tight fit: the slide arrangement is clearly shown in Figures 4 and 9.

From the foregoing description, it should be apparent that the present invention is an advance in the art of food cooking, especially frying in grease and oils. As conceived, the cooker of the invention is entirely automatic when adjusted for a particular food: for instance, fried potatoes or chips are especially adaptable and the cooking thereof once regulated for a given quantity to be fried is both easy and rapid.

More particularly, it is intended that small portions only be cooked since the action is so quick and effortless requiring no attention on the part of the operator. Besides, cooking in fat may not be relegated to far corners of the kitchen because the cooker operates perfectly without odours, or fumes, if the thermostatic switch is correctly set to keep the temperature of the frying medium below the charring or smoking point.

It must be understood that various changes as to the shape, size and arrangement of parts may be resorted to without departing from the spirit of the invention or the scope of the subjoined claim.

Having thus described my invention, I claim:

In combination, an openable enclosure, a frying bath inside said enclosure, a basket holder lowerable in the bath, a basket removably supported by said holder, a first cord attached to said holder for suspending the same, a first spring secured to said first cord for raising said basket holder from the bath, a latch for holding the basket holder down against the action of said first spring, and a timing mechanism for releasing said latch comprising a second spring attached at one end to said first cord, a second cord attached to the other end of said second spring, a free-wheeling clutch comprising an external flanged pulley, an internal shaft, a coil spring separating the pulley from the shaft, one end of said coil spring secured to said shaft, a gear wheel keyed to said shaft, said second cord wound around the flanged pulley of said clutch, a third spring attached to the free end of said second cord for freely rotating said external pulley of said clutch when the tension of said second spring is released, said second spring urging rotation of said gear wheel, a gear train meshing with said gear wheel, an oscillating disc connected to said gear wheel, and abutment means associated with said second spring for releasing said latch when tension on said second spring is released.

HOLGER L. LAWSON.

References Cited in the file of this patent

UNITED STATES PATENTS

| Number | Name | Date |
|---|---|---|
| 1,128,995 | Mayer | Feb. 16, 1915 |
| 1,812,266 | Hummel et al. | June 30, 1931 |
| 1,866,808 | Ireland | July 12, 1932 |
| 1,890,737 | Leweke | Dec. 13, 1932 |
| 1,977,454 | Price | Oct. 16, 1934 |
| 2,039,956 | Graham | May 5, 1936 |
| 2,171,510 | Stirwolt | Aug. 29, 1939 |
| 2,177,166 | Bemis | Oct. 24, 1939 |
| 2,196,968 | Bemis | Apr. 16, 1940 |
| 2,221,863 | Crane | Nov. 19, 1940 |
| 2,274,724 | McCullough | Mar. 3, 1942 |
| 2,427,564 | Claire | Sept. 16, 1947 |